M. J. SCHMITT.
AUTOMOBILE WHEEL.
APPLICATION FILED OCT. 12, 1915.
1,191,037.
Patented July 11, 1916.
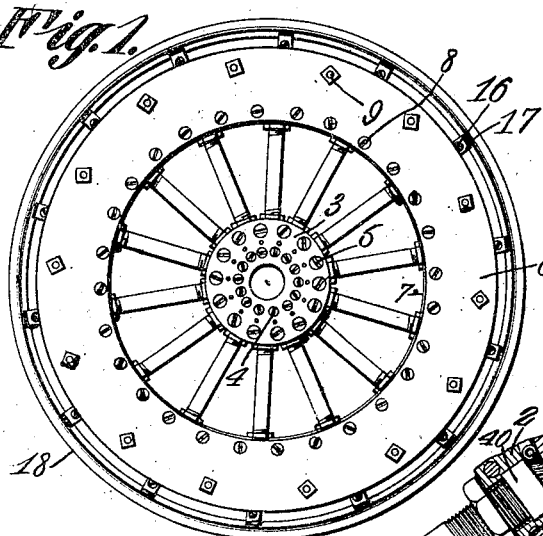
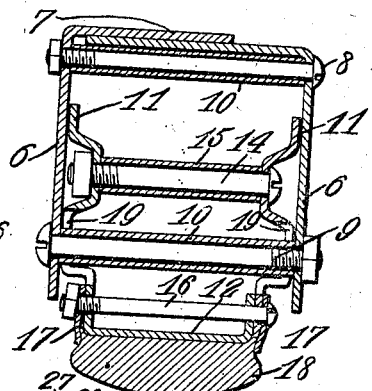
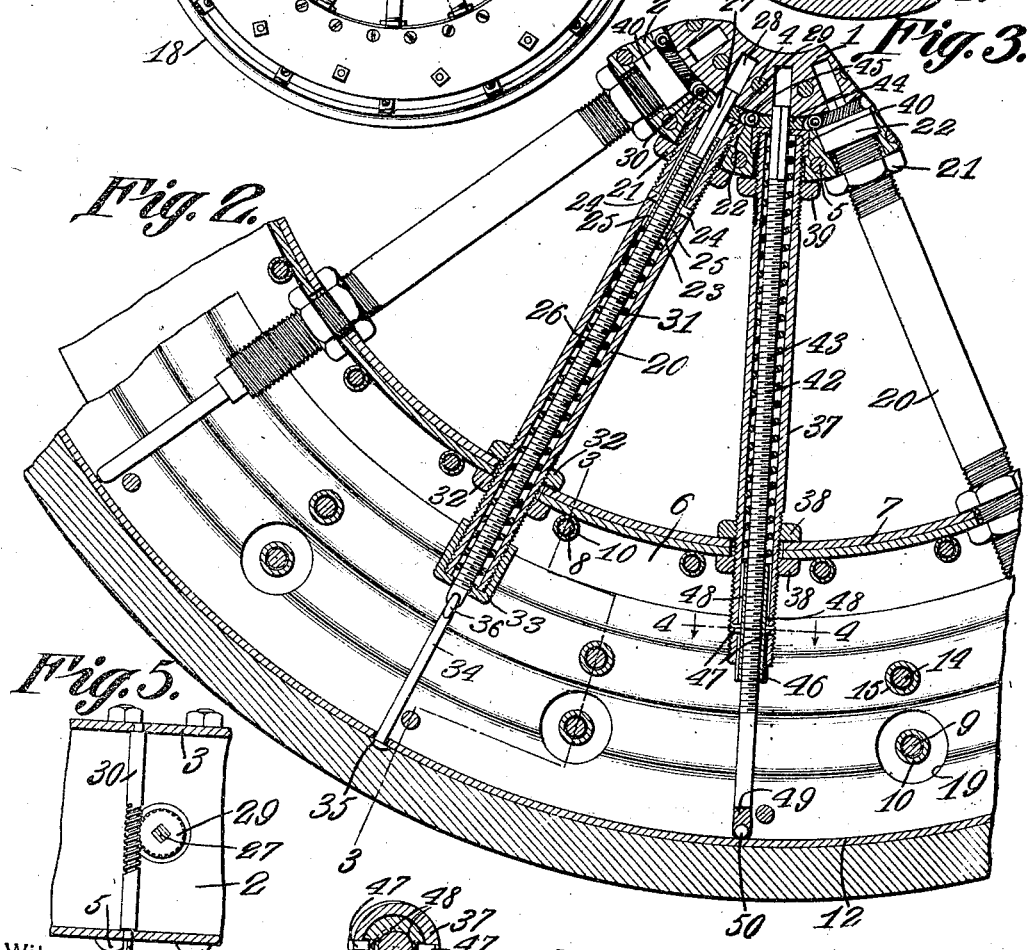
M. J. Schmitt, Inventor
by C. A. Snow & Co., Attorneys
Witnesses

UNITED STATES PATENT OFFICE.

MATHIAS J. SCHMITT, OF EMPORIA, KANSAS.

AUTOMOBILE-WHEEL.

1,191,037.   Specification of Letters Patent.   Patented July 11, 1916.

Application filed October 12, 1915. Serial No. 55,482.

*To all whom it may concern:*

Be it known that I, MATHIAS J. SCHMITT, a citizen of the United States, residing at Emporia, in the county of Lyon and State of Kansas, have invented a new and useful Automobile-Wheel, of which the following is a specification.

The device forming the subject matter of this application is a spring wheel, and one object of the invention is to dispense with pneumatic elements which are subject to puncture and deterioration.

Another object of the invention is to provide novel means for adjusting the effort of the springs whereby the rim portion of the wheel is yieldably supported and sustained.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows in side elevation, a wheel embodying the present invention; Fig. 2 is a fragmental circumferential section of a wheel embodying the present invention, parts appearing in elevation; Fig. 3 is a cross section on the line 3—3 of Fig. 2; Fig. 4 is a section on the line 4—4 of Fig. 2; Fig. 5 is a sectional detail illustrating a portion of the hub and the means whereby the effort of the springs is adjusted.

In carrying out the present invention there is provided a hub which is a composite structure, the hub comprising a core 1, an outer ring 2, side plates 3 engaging the opposite faces of the core and the outer ring, securing elements 4 uniting the core 1 with the side plates 3, and securing elements 5 uniting the outer ring 2 with the side plates 3.

The felly portion of the wheel embodies a pair of side plates 6 provided adjacent the hub with overlapped flanges 7. The side plates 6 are united by securing elements 8 and 9, and are spaced apart by sleeves 10 surrounding the securing elements.

The rim of the wheel embodies a tread 12, and side plates 11, one of which may be removable. The side plates 11 are connected by securing elements 14 and 16, the securing elements 14 being surrounded by sleeves 15 which serve to space the side plates 11 apart. The securing elements 16 may carry projecting clips 17 retaining on the tread 12, a tire 18. Since a spring wheel cannot be characterized patentably by any specific form of tire, the showing of the drawings in this regard is typical and illustrative, merely, it being understood that the tire 18 may be fashioned in any desired manner. In the side plates 11 of the rim are fashioned enlarged openings 19 through which pass the securing elements 9 and the sleeves 10, the openings 19 being of sufficient size so that the rim and the tire 18 may have the necessary movement, when the yieldable or resilient structures hereinafter to be described, are brought into operation.

The invention comprises a plurality of tubular spokes 20 passing through the outer ring 2 of the hub. Threaded onto the spokes 20 are nuts 21 which bear against the outer edge of the outer ring 2 of the hub. Cap nuts 22 are threaded onto the ends of the spokes 20 and are seated in suitably shaped recesses formed in the inner edge of the outer ring 2. Obviously, the nuts 21 and 22 serve to hold the inner end of the spoke firmly assembled with the outer ring 2 of the hub. The outer end of the spoke 20 passes through the flanges 7 of the side plates 6 of the felly and nuts 32 threaded onto the spoke 20, coact with the flanges 7 to hold the outer end of the spoke assembled with the felly in a manner which will be obvious from the drawings.

Mounted to reciprocate longitudinally in the spoke 20 relatively near to the hub is a tubular nut 23 provided with grooves 25 adapted to receive projections 24 on the spoke, the grooves and the projections constituting interengaging elements whereby the nut is prevented from rotating with respect to the spoke. Threaded into the tubular nut 23 is a screw 26 having a squared end 27 slidable in the cap nut 22, and slidable in a cap nut 33 threaded onto the outer end of the spoke 20. The squared end 27 of the screw 26 is slidably received in a socket 28 formed in the core 1 of the hub. The squared end 27 of the screw 26 is also slidable in a worm wheel 29, located between the core 1 and the outer ring 2 of the hub, the screw 26 being adapted to be rotated through the instrumentality of a worm wheel 29 and the worm wheel being rotated by means of a worm 30 journaled for rotation in the side plates 3 on the hub, the worm 30 being provided with an exposed, squared end 41, to which a wrench or like tool may be applied to secure a rotation of the worm. Located within the spoke 20 and abutting at its inner end against the tubular nut 23 is a compression spring 31 the outer end of which abuts against the cap nut 33.

The invention comprises a link 34, preferably in the form of a rod, constituting a tension connection, the outer end of the rod 34 being secured as indicated at 35 to the tread 12. The inner end of the link 34 terminates in a hook 36 engaged in an opening in the outer end of the screw 26.

Alternating with the tubular spokes 20 are tubular spokes 37 secured to flanges 7 of the side plates of the felly by means of nuts 38, a nut 39 on the inner end of the spoke 37 engaging the outer edge of the outer ring 2 of the hub, and a cap nut 40 on the inner end of the spoke 37 coacting with the inner edge of the outer ring 2 of the hub, in a manner described hereinbefore in connection with the cap nut 22.

Disposed within the tubular spoke 27 is a compression spring 42, the inner end of which abuts against the cap nut 40, the outer end of which abuts against a nut 46, mounted to slide longitudinally in the spoke 37, near to the outer end of the spoke, the nut 46 being equipped with grooves 48, coacting with projections 47 on the spoke, to prevent a rotation of the said nut. Threaded into the tubular nut 46 is a screw 43 actuated by a worm wheel 44 and a worm 45, in the manner hereinbefore described. In the outer end of the screw 43 is fashioned a seat 49 adapted to receive a ball 50 which bears against the inner surface of the tread portion 12 of the rim.

At times, as will be understood readily from the drawings, the screw 43 in the spoke 37 will be pressed inwardly, the spring 42 being put under compression. At times, the screw 26 in the tubular spoke 20 will be drawn outwardly, the spring 31 being put under compression.

The effort of the spring 31 may be adjusted by rotating the screw 26 through the medium of the worm wheel 29 and the worm 30, it being observed that under such circumstances, the tubular nut 23 will be advanced or retracted, the tubular nut being interlocked with the spoke 20 for sliding movement longitudinally of the spoke, against rotation with respect to the spoke. The spring 42 in the tubular spoke 37 is adjusted in a similar manner, by rotating the screw 43 through the medium of the worm wheel 44 and the worm 45.

Having thus described the invention, what is claimed is:—

1. In a spring wheel, a hub; a felly; a rim movable with respect to the felly; spokes connecting the hub and the felly, one spoke being tubular; a screw slidable in the tubular spoke and coacting with the rim; a nut into which the screw is threaded, the nut being slidable in the said spoke; interengaging elements on the nut and the said spoke for holding the nut against rotation; a spring one end of which is engaged by the nut; and means for engaging the other end of the spring.

2. In a spring wheel, a hub; a felly; a rim movable with respect to the felly; spokes connecting the hub and the felly, one spoke being tubular; a screw slidable in the tubular spoke and coacting with the rim; a nut into which the screw is threaded, the nut being slidable in the said spoke; interengaging elements on the nut and the said spoke for holding the nut against rotation; a spring engaged at one end by the nut; means for engaging the other end of the spring; and means for rotating the screw.

3. In a spring wheel, a hub; a felly; a rim movable with respect to the felly; spokes connecting the hub and the felly, one spoke being tubular; a screw slidable in the tubular spoke and coacting with the rim; a nut into which the screw is threaded, the nut being slidable in the said spoke; interengaging elements on the nut and the said spoke for holding the nut against rotation; a spring engaging at one end by the nut; means for engaging the other end of the spring; and a hub carried wheel in which the screw is slidable, the wheel and the screw being interengaged for simultaneous rotation.

4. In a spring wheel, a hub; a felly; a rim movable with respect to the felly; spokes connecting the hub and the felly, one spoke being tubular; a screw slidable in the tubular spoke and coacting with the rim; a nut into which the screw is threaded, the nut being slidable in the said spoke; interengaging elements on the nut and the said spoke for holding the nut against rotation; a spring engaged at one end by the nut; means for engaging the other end of the spring; a hub carried worm wheel in which the screw is slidable, the worm wheel and the screw being interengaged for simultaneous rotation; and a hub carried worm meshing into the worm wheel.

5. In a spring wheel, a hub; a felly; a rim movable with respect to the felly; spokes connecting the hub and the felly, one spoke being tubular; a screw slidable in the tubular spoke; a tension connection between the outer end of the screw and the rim; a nut into which the screw is threaded, the nut being slidable in the said spoke and being located adjacent the hub; interengaging elements on the nut and on the said spoke for holding the nut against rotation; a spring abutting at its inner end against the nut; a spoke-carried abutment receiving the outer end of the spring; and hub-carried means operatively connected with the screw to rotate the screw.

6. In a spring wheel, a hub; a felly; a rim movable with respect to the felly; spokes connecting the hub and the felly, one spoke being tubular; a screw slidable in the tubular spoke and abutting at its outer end against the rim; a nut into which the screw is threaded, the nut being located at the outer end of the said spoke and being slidable in the said spoke; interengaging elements on the nut and the said spoke for holding the nut against rotation; a spring abutting at its outer end against the nut; means for engaging the inner end of the spring; and hub carried means for rotating the screw.

7. In a spring wheel, a hub; a felly; a rim movable with respect to the felly; primary and secondary tubular spokes connecting the hub and the felly; screws longitudinally slidable in the spokes, one screw abutting against the rim; a tension connection between the other screw and the rim; a nut slidable in the outer end of the primary spoke; a nut slidable in the inner end of the secondary spoke, the respective screws being threaded into the nuts; interengaging elements on the nuts and on the screws for holding the nuts against rotation; springs in the spokes and engaged at one end with the nuts; means for engaging the other ends of the springs; and separate means for rotating the screws.

In testimony that I claim the foregoing as my own, I have hereto affixed my signature in the presence of two witnesses.

MATHIAS J. SCHMITT.

Witnesses:
CHARLES J. MCCARTHY.
S. D. NEWTON.